United States Patent [19]

Langhauser et al.

[11] Patent Number: 5,627,246
[45] Date of Patent: May 6, 1997

[54] SUPPORTED METALLOCENE COMPLEXES HAVING HETEROFUNCTIONAL GROUPS IN THE CYCLOPENTADIENYL SYSTEM AS CATALYST SYSTEMS

[75] Inventors: Franz Langhauser, Bad Dürkheim; David Fischer, Gönnheim; Jürgen Kerth, Carlsberg; Günther Schweier, Friedelsheim; Elke Barsties, Constance, all of Germany; Hans-Herbert Brintzinger, Taegerswilen, Switzerland; Stefan Schaible; Werner Roell, both of Constance, Germany

[73] Assignee: BASF Aktiengesellschaft, Ludwigshafen, Germany

[21] Appl. No.: 396,716

[22] Filed: Mar. 1, 1995

[30] Foreign Application Priority Data

Mar. 3, 1994 [DE] Germany ............... 44 06 964.2

[51] Int. Cl.[6] ............... C08F 4/628; C08F 10/00
[52] U.S. Cl. ............... 526/128; 502/104; 502/117; 502/120; 502/125; 526/127; 526/129; 526/351
[58] Field of Search ............... 502/117, 120, 502/125, 104; 526/128, 129, 160, 127

[56] References Cited

U.S. PATENT DOCUMENTS 5,071,808 12/1991 Antberg et al. .

5,329,033 7/1994 Spaleck et al. ............... 526/129

FOREIGN PATENT DOCUMENTS

| 206794 | 12/1986 | European Pat. Off. . |
| 279863 | 8/1988 | European Pat. Off. . |
| 372414 | 6/1990 | European Pat. Off. . |
| 571882 | 12/1993 | European Pat. Off. . |
| 582195 | 2/1994 | European Pat. Off. . |

OTHER PUBLICATIONS

Booth et al., *J. of Org. Chem.*, vol. 315, 1986, pp. 143–156.

*Primary Examiner*—Edward J. Smith
*Attorney, Agent, or Firm*—Keil & Weinkauf

[57] ABSTRACT

A supported catalyst system that is obtained by
a) reacting a finely divided carrier with an a-trisalkoxy-silyl-ω-haloalkyl compound,
b) adding a metallocene complex of the indicated formula I to the reaction product of a);
c) reacting the product of b) with a quaternizing agent; and
d) optionally adding an open-chain or cyclic alumoxane compound.

The catalyst system can be used to prepare polymers of $C_2$–$C_{10}$-alk-1-enes.

4 Claims, No Drawings

SUPPORTED METALLOCENE COMPLEXES HAVING HETEROFUNCTIONAL GROUPS IN THE CYCLOPENTADIENYL SYSTEM AS CATALYST SYSTEMS

The present invention relates to supported catalyst systems, obtainable by a) reacting a finely divided carrier with an α-trisalkoxysilyl-ω-haloalkyl compound, b) adding a metallocene complex of the general formula I

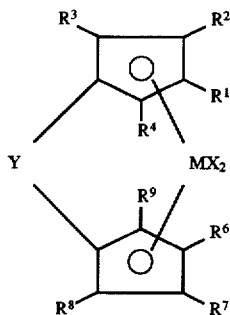

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or —$OR^5$, $R^5$ is $C_1$–$C_{10}$-alkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $R^1$ to $R^3$ and $R^6$ to $R^8$ are each hydrogen, $C_1$–$C_{10}$-alkyl, 5-membered to 7-membered cycloalkyl which in turn may carry $C_1$–$C_{10}$-alkyl radicals as substituents, $C_6$–$C_{15}$-aryl or arylalkyl, where two neighboring radicals together may furthermore be a cyclic group of 4 to 15 carbon atoms, or $Si(R^{10})_3$, $R^{10}$ is $C_1$–$C_{10}$-alkyl, $C_6$–$C_{15}$-aryl or $C_3$–$C_{10}$-cycloalkyl, $R^4$ is

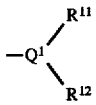

$Q^1$ is nitrogen, phosphorus, arsenic, antimony or bismuth, $R^{11}$ and $R^{12}$ are each $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, or the two radicals together may be a cyclic group of 2 to 15 carbon atoms which in turn may contain 1 to 8 heteroatoms of main groups III to VI of the Periodic Table of Elements, $R^9$ is hydrogen, $C_1$–$C_{10}$-alkyl, 5-membered to 7-membered cycloalkyl which in turn may carry $C_1$–$C_{10}$-alkyl radicals as substituents, $C_6$–$C_{15}$-aryl or arylalkyl, where two neighboring radicals together may furthermore be a cyclic group of 4 to 15 carbon atoms, or $Si(R^{13})_3$ or

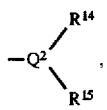

$R^{13}$ is $C_1$–$C_{10}$-alkyl, $C_6$–$C_{15}$-aryl or $C_3$–$C_{10}$-cycloalkyl, $Q^2$ is nitrogen, phosphorus, arsenic, antimony or bismuth, $R^{14}$ and $R^{15}$ are each $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, or the two radicals together may be a cyclic group of 2 to 15 carbon atoms which in turn may contain 1 to 8 heteroatoms of main groups III to VI of the Periodic Table of Elements, Y is

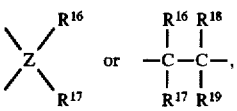

Z is silicon, germanium, tin or carbon and, $R^{16}$, $R^{17}$, $R^{18}$ and $R^{19}$ are each hydrogen, $C_1$–$C_{10}$-alkyl, $C_3$–$C_{10}$-cycloalkyl or $C_6$–$C_{15}$-aryl, where two neighboring radicals together may furthermore be a cyclic group of 4 to 15 carbon atoms, c) reacting with a quaternizing agent of the general formula V $$A_aX^2 \qquad V$$

where

A is $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $X^2$ is fluorine, chlorine, bromine, iodine, $SO_3^{2-}$, $SO_4^{2-}$ or $NO_3^-$ and a is 1 or 2, and d) if required, adding an open-chain or cyclic alumoxane compound of the general formula VI or VII

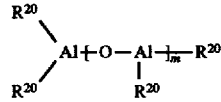

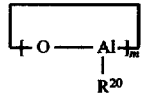

where $R^{20}$ is $C_1$–$C_4$-alkyl and m is an integer from 5 to 30, in the stated sequence.

The present invention furthermore relates to processes for the preparation of such supported catalyst systems, their use for the polymerization of alkenes and processes for the preparation of polymers of $C_2$–$C_{10}$-alk-1-enes using the novel supported catalyst systems.

Metallocene catalysts in which a zirconocene or titanocene component and an alumoxane are applied to a silicate carrier together from a solution by impregnation are described in EP-A 206 794. However, the catalyst components are inhomogeneously distributed over the carrier and in addition are not anchored sufficiently firmly on the carrier, so that they are extracted during the polymerization.

EP-A 372 414 discloses that, by introducing homofunctional groups, for example vinyl substituents, in the cyclopentadiene radical of a metallocene, it is possible to achieve chemical fixation of the metallocene on a suitable carrier. The fact that the preparation of the carriers is complicated and expensive is a disadvantage here.

It is an object of the present invention to provide a supported metallocene catalyst system in which the metallocene complex can be bonded to a conventional carrier by chemical reaction and which is used as a catalyst for the polymerization of alkenes. We have found that this object is achieved by the supported catalyst systems discussed at the outset.

We have also found processes for the preparation of said supported catalyst systems, their use for the polymerization of alkenes and processes for the preparation of polymers of $C_2$–$C_{10}$-alk-1-enes using the novel supported catalyst systems.

For the preparation of the novel supported catalyst systems, a finely divided carrier is reacted with an α-trisalkoxysilyl-ω-haloalkyl compound in a first stage a).

Suitable carriers can be synthesized from oxides of the elements of main group III or IV of the Periodic Table or mixtures thereof. For example, silica gels, in particular those of the formula $SiO_2 \cdot b\ Al_2O_3$, where b is from 0 to 2, preferably from 0 to 0.5, are preferred; these are therefore aluminosilicates or silica. The carriers preferably have a particle diameter of from 1 to 200 μm, in particular from 30 to 80 μm. Such products are commercially available, for example silica gel 332 from Grace, silica gel 60 from Merck or silica gel from Baker.

Preferably used α-trisalkoxysilyl-ω-haloalkyl compounds are $$Si(OR^{21})_3\text{—}R^{22}\text{—}R^{23}X^3 \qquad \text{VIII}$$

where $R^{21}$ is $C_1$–$C_{20}$-alkyl, in particular methyl or ethyl, or $C_6$–$C_{15}$-aryl, preferably phenyl, $R^{22}$ is a —$(CH_2)_n$— group or $C_6$–$C_{15}$-aryl which may be mono-substituted to tetrasubstituted by $C_1$–$C_4$-alkyl, in particular 1,4-phenyl, n is an integer from 3 to 10, $R^{23}$ is $C_1$–$C_{10}$-alkyl, preferably methyl, and $X^3$ is fluorine, chlorine, bromine or iodine, in particular chlorine.

A preferably used compound VIII is (chloromethyl)phenyltrimethoxysilane.

The carriers can be prepared, for example, by reacting them with 3-halopropyl-1-triethoxysilane, as described in J. S. Fritz and J. N. King, Anal. Chem., 48 (1976), 570–572 and W. A. Aue and C. R. Hastings, J. Chromatog. 42 (1969), 319–335. The reaction of the carrier with an α-trisalkoxysilyl-ω-haloalkyl compound is known per se and is described, for example, in P. Tundo and P. Venturello, J. Am. Chem. Soc. 101 (1979), 6606–6613, and P. Tundo and P. Venturello, J. Am. Chem. Soc. 104 (1982), 6547–6551. In order to mask any OH groups remaining on the carrier, according to J. Köhler et al., J. Chromatog. 352 (1986), 275–305, aftertreatment may be effected with, for example, trimethylchlorosilane.

However, such functionalized carriers as formed in stage a) are also commercially available, for example 3-chloropropyl-functionalized silica gel from Aldrich.

In a second stage b), a metallocene complex of the general formula I is then added to the carrier functionalized in stage a).

Preferred metallocene complexes of the general formula I

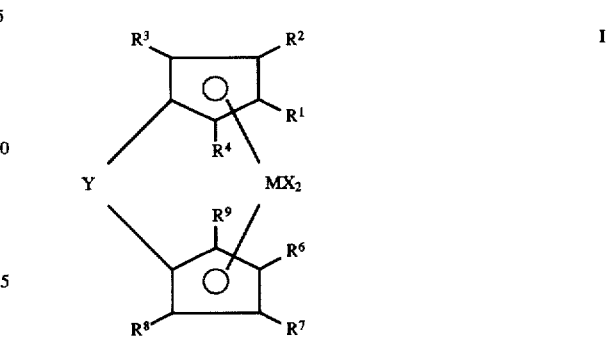

are those in which

M is titanium, zirconium or hafnium,

X is chlorine or $C_1$–$C_4$-alkyl, $R^1$ to $R^3$ and $R^6$ to $R^8$ are each hydrogen, $C_1$–$C_6$-alkyl or phenyl, or two neighboring radicals together are a cyclic group of 4 to 12 carbon atoms, particularly indenyl, $C_1$–$C_4$-alkyl-substituted indenyls or benzindenyl, $R^1$ and $R^6$, as well as $R^2$ and $R^7$, and $R^3$ and $R^8$, preferably having the same meaning, $Q^1$ is nitrogen, phosphorus or arsenic, $R^{11}$ and $R^{12}$ are preferably identical and each $C_1$–$C_6$-alkyl, or the two radicals together are a cyclic group of 2 to 8 carbon atoms which in turn may contain 1 to 6, in particular 1 to 4, heteroatoms from main groups III to VI of the Periodic Table of Elements, P and N being preferred, $R^4$ is dimethylamino or pyrrolidino, Y is $R^9$ is preferably identical to $R^4$,

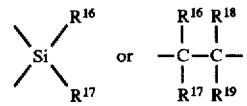

and $R^{16}$, $R^{17}$, $R^{18}$ and $R^{19}$ are each hydrogen or $C_1$–$C_6$-alkyl. Particularly preferred metallocene complexes I are:

Dimethylsilanediyl-bis(2-N,N-dimethylamino-4-tert-butylcyclopentadienyl)zirconium dichloride, Dimethylsilanediyl-bis(2-N,N-dimethylamino-4-phenylcyclopentadienyl)zirconium dichloride, Dimethylsilanediyl-bis(2-N,N-dimethylamino-4-isopropylcyclopentadienyl)zirconium dichloride, Dimethylsilanediyl-bis(2-N,N-dimethylamino-4-tert-butylcyclopentadienyl)titanium dichloride, Dimethylsilanediyl-bis(2-N,N-dimethylamino-4-tert-butylcyclopentadienyl)hafnium chloride, Dimethylsilanediyl-bis(2-N,N-dimethylamino-4-tert-butylcyclopentadienyl)zirconiumdimethyl, Dimethylsilanediyl-bis(2-N,N-dimethylamino-4-tert-butylcyclopentadienyl)hafniumdimethyl, Dimethylsilanediyl-bis(2-N,N-dimethylamino-4-tert-butylcyclopentadienyl)titaniumdimethyl, Dimethylsilanediyl-bis(2-N,N-dimethylaminoindenyl) titanium dichloride, Dimethylsilanediyl-bis(2-N,N-dimethylaminoindenyl) zirconium dichloride,
Dimethylsilanediyl-bis(2-N,N-dimethylaminoindenyl) hafnium dichloride,
Dimethylsilanediyl-bis(2-N,N-dimethylaminobenzindenyl) titanium dichloride,
Dimethylsilanediyl-bis(2-N,N-dimethylaminobenzindenyl) zirconium dichloride,
Dimethylsilanediyl-bis(2-N,N-dimethylaminobenzindenyl) hafnium dichloride,
Dimethylsilanediyl-bis(2-pyrrolidinoindenyl)titanium dichloride,
Dimethylsilanediyl-bis(2-pyrrolidinoindenyl)zirconium dichloride,
Dimethylsilanediyl-bis(2-pyrrolidinoindenyl)hafnium dichloride,
Dimethylsilanediyl-bis(2-pyrrolidinobenzindenyl)titanium dichloride,
Dimethylsilanediyl-bis(2-pyrrolidinobenzindenyl) zirconium dichloride and
Dimethylsilanediyl-bis(2-pyrrolidinobenzindenyl)hafnium dichloride.

The metallocene complexes I can be prepared so that ligand systems II

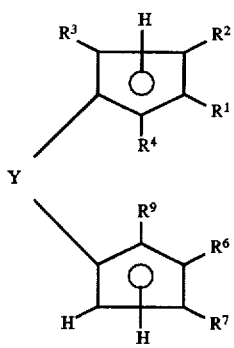

II occur as intermediates. Regarding the preferred substituents, the statements made in the case of the metallocene complexes I are applicable.

A preferred process for the preparation of the metallocene complexes I and hence also for the preparation of the ligand systems II is the following:

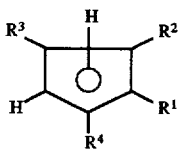

III and

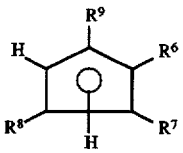

IV are reacted with metallating reagents, such as alkali metal or alkaline earth metal alkyls or hydrides, preferably n-butyllithium, methyllithium or potassium hydride, and then with $Y(X^1)_2$, where $X^1$ is fluorine, chlorine, bromine or iodine, preferably chlorine, and the ligand systems II are thus obtained.

The reaction conditions are in principle not critical. Usually, organic solvents, such as ethers and/or hydrocarbons, preferably diethyl ether or tetrahydrofuran (THF), are added to III and IV and the mixture is cooled to temperatures of from $-80°$ C. to $0°$ C.

The metallating agents, preferably n-butyllithium, to which a solvent, such as hexane, is preferably added, are then introduced. The mixture is heated to room temperature, after which $Y(X^1)_2$, to which an organic solvent, such as diethyl ether or THF, has likewise been added, is introduced. Working up is effected by precipitation or crystallization.

The ligand systems II can then likewise be reacted with metallating agents, such as alkali metal or alkaline earth metal alkyls or hydrides, preferably n-butyllithium, and then with $MX_4$, the metallocene complexes I being formed.

The reaction conditions for the preparation of the metallocene complexes I are also not critical; in a preferred procedure, organic solvents, such as ethers, preferably diethyl ether, are added to II and the mixture is cooled to temperatures of from $-80°$ C. to $0°$ C. The metallating agents, to which a solvent, such as hexane, has preferably been added, are then introduced. After heating to room temperature, and the addition of a hydrocarbon, preferably pentane, as a nonpolar solvent, the corresponding ligand-lithium salt can be separated off and isolated. This ligand-lithium salt is then preferably mixed with $MX_4$ under an inert gas atmosphere. Separation of the resulting isomer mixtures into the racemate and meso form is effected by fractional crystallization from conventional solvents, such as hydrocarbons, ethers or halohydrocarbons or mixtures thereof.

The reaction conditions in stage b) are in principle not critical. Usually, an organic solvent, such as an aromatic hydrocarbon, preferably toluene, is added to the metallocene complexes I, and the carrier obtained in stage a) is introduced. The amount of metallocene complex is from 0.1 to 2, preferably from 0.1 to 1, % by weight, based on the carrier obtained in stage a). Heating can then be carried out for from 0.5 to 12 hours at from $30°$ to $90°$ C. and, after extraction, the supported metallocene complex can be filtered off from the resulting suspension and dried. In the supported metallocene complex obtained in stage b), the heterofunctional group of metallocene compound is present together with the carrier as an ion pair.

In a third stage c), the supported metallocene complex obtained in stage b) is then reacted with a quaternizing agent of the general formula V $$A_a X^2 \quad \quad V$$

where

A is $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $X^2$ is fluorine, chlorine, bromine, iodine, $SO_3^{2-}$, $SO_4^{2-}$ or $NO_3^-$, and a is 1 or 2.

Preferred compounds of the general formula V are $C_1$–$C_6$-alkyl halides, in particular methyl iodide, and $C_6$–$C_{10}$-aryl halides, in particular 2,4,6-trimethylbenzyl chloride.

The reaction conditions are in principle not critical. Usually, the reaction is carried out by a method in which an organic solvent, such as an aromatic hydrocarbon, preferably toluene, is added to the supported metallocene complexes, and the quaternizing agents are introduced, preferably at room temperature.

The solvent is then removed and the residue is dried.

The amount of quaternizing agent V is from 1 to 500, preferably from 1 to 200, molar equivalents, based on the metallocene I.

In a further stage d), a cocatalyst in the form of an open-chain or cyclic alumoxane compound of the general formula VI or VII

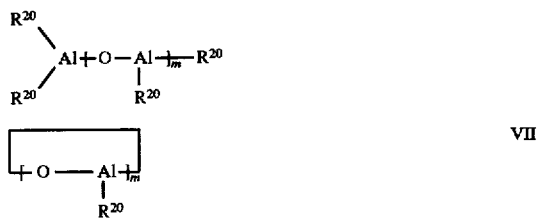

where $R^{20}$ is $C_1-C_4$-alkyl, preferably methyl or ethyl, and m is an integer from 5 to 30, preferably from 10 to 25, can, if required, then be added.

The preparation of these oligomeric alumoxane compounds VI or VII is usually carried out by reacting a solution of a trialkylaluminum with water and is described in, inter alia, EP-A 284 708 and U.S. Pat. No. 4,794,096.

As a rule, the resulting oligomeric alumoxane compounds are present as mixtures of both linear and cyclic chain molecules of different lengths, so that m is to be regarded as an average value. The alumoxane compounds may also be present as a mixture with other metal alkyls, preferably with aluminum alkyls.

It has proven advantageous to use the metallocene complexes I and the oligomeric alumoxane compound in amounts such that the atomic ratio of aluminum from the oligomeric alumoxane compound to the transition metal from the metallocene complex I is from 10:1 to $10^6$:1, in particular from 10:1 to $10^4$:1.

In a preferred procedure, a solution of the oligomeric alumoxane compound, preferably in toluene, is added to the material obtained in stage c).

However, Lewis acids may also be used as cation-forming agents for the transition metal from the metallocene complex, as described in EP-A 277 003 and EP-A 277 004.

The novel supported catalyst systems have a homogeneous distribution of the metallocene complex on the carrier and are very free-flowing and insensitive to washing out of the active catalyst components. They are particularly suitable for the prepartion of polymers of $C_2-C_{10}$-alk-1-enes.

Polymers of $C_2-C_{10}$-alk-1-enes are to be understood as meaning homo- or copolymers of $C_2-C_{10}$-alk-1-enes, in particular of $C_2-C_6$-alk-1-enes. Homopolymers of ethylene or of propylene and copolymers of ethylene and propylene, ethylene and but-1-ene, ethylene and pent-1-ene, ethylene and hex-1-ene, propylene and but-1-ene, propylene and pent-1-ene, and propylene and hex-1-ene are preferred. The amount of comonomer may be up to 50, in particular up to 30, % by weight.

The polymerization may be carried out in solution, in suspension, in the gas phase or as mass polymerization. The process for the preparation of the polymers of $C_2-C_{10}$-alk-1-enes is preferably carried out in solution or in the gas phase. The polymerization conditions are in principle not critical; pressures of from 0.5 to 3000, preferably from 1 to 80, bar and temperatures of from $-50°$ to $+300°$ C., preferably from $0°$ to $150°$ C., have proven suitable. The polymerization may be carried out in the presence of conventional regulators, for example hydrogen or $C_2-C_8$-alk-1-enes, and in conventional polymerization reactors.

In a preferred process for the preparation of homopolymers of $C_2-C_{10}$-alk-1-enes, the active components of the catalyst system are initially taken in toluene at from $0°$ to $140°$ C.

For this purpose, the $C_2-C_{10}$-alk-1-ene is forced in at from 1 to 60 bar over a period of from 0.5 to 12 hours. The polymers are then worked up by a conventional method.

The process described for the preparation of polymers of $C_2-C_{10}$-alk-1-enes is distinguished by cheap processing engineering.

The $C_2-C_{10}$-alk-1-ene polymers prepared by the process described have a balanced property profile and are suitable for the preparation of fibers, films and moldings.

EXAMPLES

Examples 1 to 3

Preparation of the functionalized carriers in stage a)

Example 1

2.96 g ($\hat{=}12$ mmol) of (chloromethyl)phenyltrimethoxysilane were dissolved in 40 ml of toluene and refluxed with 8.28 g of silica gel from Baker for 2 hours at $115°$ C. 10 ml of the volatile components were then stripped off under reduced pressure, and the residue was then refluxed for a further hour at $115°$ C. After cooling, the mixture was filtered and the residue was washed with four times 40 ml of diethyl ether and dried for 12 hours under greatly reduced pressure. 9.61 g of the functionalized carrier were obtained, and said carrier was subjected to the following aftertreatment:

15 ml ($\hat{=}120$ mmol) of trimethylchlorosilane were added to 2.55 g of the functionalized carrier at $70°$ C. under an argon atmosphere. The product was then washed with twice 20 ml of toluene and with, twice 20 ml of diethyl ether and dried for 12 hours under greatly reduced pressure. 2.47 g of the aftertreated functionalized carrier were obtained.

Example 2

2.98 g ($\hat{=}12.1$ mmol) of (chloromethyl)phenyltrimethoxysilane were dissolved in 40 ml of toluene similarly to Example 1 and reacted with 8.09 g of silica gel 60 from Merck. 9.20 g of the functionalized carrier were obtained, and said carrier was likewise subjected to an aftertreatment:

2.45 g of the functionalized carrier were aftertreated similarly to Example 1, 2.39 g of the aftertreated functionalized carrier being formed.

Example 3

5.2 g of the 3-chloropropyl-functionalized silica gel from Aldrich were aftertreated by suspension in 25 ml of toluene and the addition of 1.75 ml ($\hat{=}12.5$ mmol) of triethylamine and 12.5 ml ($\hat{=}100$ mmol) of trimethylchlorosilane. Refluxing was then carried out for 60 hours at $111°$ C., the mixture was filtered and the residue was then washed with four times 20 ml of toluene and extracted with 100 ml of dry ethanol. The remaining material was then dried at $80°$ C. under greatly reduced pressure. 4.4 g of product were obtained. 0.4 g ($\hat{=}2.7$ mmol) of heated soidum iodide in 50 ml of dry acetone was added to 4.0 g of said product, refluxing was carried out for 12 hours and the mixture was then filtered. The remaining residue was refluxed with 100 ml of acetone for a further 12 hours and then extracted with 100 ml of toluene. 4.2 g of the aftertreated 3-iodopropyl-functionalized carrier were obtained.

Examples 4 to 6

Preparation of the supported metallocene complexes in stage b)

Preparation of dimethylsilanediylbis(2-N,N-dimethylaminoindenyl)zirconium dichloride I1

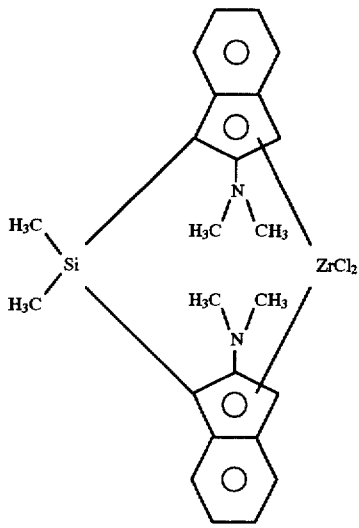

I1 a) Preparation of the ligand system bis(2-N,N-dimethylaminoindenyl)dimethylsilane II1

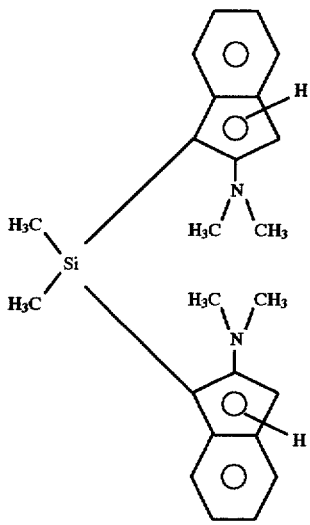

II1

5.69 g ($\hat{=}$36 mmol) of 2-N,N-dimethylaminoindene III1 were dissolved in 100 ml of diethyl ether and cooled to –10° C. 22.4 ml ($\hat{=}$36 mmol) of a 1.6 molar solution of n-butyllithium in hexane were added then, after thawing, the mixture was stirred for 8 hours at room temperature. 2.24 ml ($\hat{=}$18 mmol) of dimethyldichlorosilane in 20 ml of diethyl ether were then added and stirring was continued for a further 18 hours. The precipitated lithium chloride was filtered off and the filtrate was evaporated down to half the amount and cooled to –80° C. 3.24 g ($\hat{=}$14 mmol, 48% of theory) of II1 were obtained as a slightly gray, fine crystalline precipitate.

$^1$H-NMR (CDCl$_3$, δ rel TMS):

| d [ppm] (mult.) | Number | J [Hz] | Assignment |
|---|---|---|---|
| –1.59 (s) | | | |
| –0.41 (s) | 6 | | |
| –0.23 (s) | | | Si(CH$_3$)$_3$ |
| 2.77 (s) | 12 | 17.7 | N(CH$_3$)$_2$ |
| 3.93 (d) | 2 | 16.9 | H in five-membered ring |
| 5.63 (d) | 2 | | H in five-membered ring |
| 6.8–7.4 (m, broad) | 8 | | Aromat. H | b) Conversion of II1 to I1

17.56 g ($\hat{=}$47 mmol) of II1 were dissolved in 250 ml of diethyl ether and cooled to –10° C. 58.75 ml ($\hat{=}$94mmol) of a 1.6 molar solution of n-butyllithium in hexane were added. After the mixture had been stirred for 2 hours at room temperature, 100 ml of n-pentane were added, stirring was carried out for a further hour and the mixture was then filtered. 17.21 g ($\hat{=}$44.5 mmol, 94.7% of theory) of the ligand-lithium salt were obtained.

3 g ($\hat{=}$7.7 mmol) of this ligand-lithium salt were dry-blended with 1.79 g ($\hat{=}$7.7 mmol) of ZrCl$_4$ under inert gas atmosphere. 100 ml of toluene were added and the brownish yellow suspension was stirred for 18 hours at room temperature. The supernatant solution was removed and was evaporated to dryness under reduced pressure from an oil pump. 1 g ($\hat{=}$1.8 mmol, 24% of theory) of I1 with a ratio of racemate to meso form of 3:1 was obtained in this manner.

The residue from the reaction batch was extracted with 150 ml of methylene chloride, filtered and cooled to –80° C. 1.5 g ($\hat{=}$2.4 mmol, 36% of theory) of I1 crystallized from this solution. 0.7 g of pure rac-I1 was obtained by recrystallization from methylene chloride/diethyl ether (volume ratio 1:9) at –80° C.

$^1$H-NMR (CDCl$_3$, δ rel TMS):

| d [ppm] (mult.) | Number | Assignment |
|---|---|---|
| racemic compound | | |
| 1.29 (s) | 6 | Si(CH$_3$)$_2$ |
| 2.61 (s) | 12 | N(CH$_3$)$_2$ |
| 6.39 (s) | 2 | Cp-H |
| 6.74–7.55 (m, broad) | 8 | Aromat. H |
| meso compound | | |
| 1.32 (s) | 3 | Si(CH$_3$)$_2$ |
| 1.36 (s) | 3 | Si(CH$_3$)$_2$ |
| 2.80 (s) | 12 | N(CH$_3$)$_2$ |
| 6.40 (s) | 2 | Cp-H |
| 6.74–7.55 (m, broad) | 8 | Aromat. H |

Mass spectrum (EI, 70 eV, 220° C.) m/e=534 (M$^+$, 22.3%), 376 (M$^+$-C$_9$H$_6$N(CH$_3$)$_2$, 14.9%).

Example 4

230 mg ($\hat{=}$ 0.44 mmol) of rac-dimethylsilanediylbis(2-N, N-dimethylaminoindenyl)zirconium dichloride 1 were dissolved in 50 ml of toluene. 2.16 g of the aftertreated functionalized carrier prepared according to Example 1 were added and refluxing was carried out for 12 hours. The suspension was then extracted with 50 ml of toluene for 12 hours. After filtration, drying was carried out for 12 hours under greatly reduced pressure. 2.34 g of the supported metallocene complex having a Zr content of 1.3% were obtained.

Example 5

2.06 g of the aftertreated functionalized carrier prepared according to Example 2 were added to 544 mg (≙1.02 mmol) of racdimethylsilanediylbis(2-N,N-dimethylaminoindenyl) zirconium dichloride I1, similarly to Example 4. 2.36 g of the supported metallocene catalyst having a Zr content of 2.5% were obtained.

Example 6

3.0 g of the aftertreated functionalized carrier prepared according to Example 3 were added to 500 mg (≙0.94 mmol) of rac-dimethylsilanediylbis(2-N,N-dimethylaminoindenyl) zirconium dichloride I1, similarly to Example 4. 3.24 g of the supported metallocene catalyst having a Zr content of 1.4% were obtained.

Examples 7 to 9

Reaction with a quaternizing agent in stage c)

Example 7

0.1 ml (≙1.6 mmol) of methyl iodide was added to a suspension of 2 g of the supported metallocene complex, prepared according to Example 4, in 30 ml of toluene and at room temperature. The solvent was then removed with reduced pressure from an oil pump, and the remaining residue was dried for 1 hour under greatly reduced pressure. A free-flowing powder was obtained.

Example 8

0.1 ml (≙1.6 mmol) of methyl iodide was added to a suspension of 2 g of the supported metallocene complex, prepared according to Example 5, in 30 ml of toluene, similarly to Example 7.

Example 9

0.1 ml (≙1.6 mmol) of methyl iodide was added to a suspension of 2 g of the supported metallocene complex, prepared according to Example 6, in 30 ml of toluene, similarly to Example 7.

Examples 10 to 12

Addition of methyl alumoxane in stage d)

Example 10

The free-flowing powder (2 g) prepared in Example 7 was introduced, together with 37 ml (≙56 mmol) of a 1.53 molar solution of methyl alumoxane in toluene (from Witco), into a dry 10 steel autoclave flushed with nitrogen.

Example 11

71 ml (≙109 mmol) of a 1.53 molar solution of methyl alumoxane in toluene (from Witco) were added, similarly to Example 10, to the free-flowing powder (2 g) prepared in Example 8.

Example 12

39 ml (≙60 mmol) of a 1.53 molar solution of methyl alumoxane in toluene (from Witco) were added, similarly to Example 10, to the free-flowing powder (2 g) prepared in Example 9.

Examples 13 to 15

Preparation of polypropylene (PP) by gas-phase polymerization

The autoclaves filled with the particular supported catalyst systems of Examples 10, 11 and 12 were heated to 70° C. and the internal pressure was gradually increased to a final pressure of bar by feeding in propylene. Polymerization was then carried out for 1.5 hours, fresh propylene being supplied by means of automatic pressure regulation. After the end of the reaction, the pressure was let down to atmospheric pressure in the course of 10 minutes and the resulting PP was discharged in a nitrogen stream.

The results are summarized in the table.

TABLE

|  | Ex. 13 | Ex. 14 | Ex. 15 |
|---|---|---|---|
| Yield [g] | 1092 | 2214 | 540 |
| Productivity [g/g of supported catalyst system] | 546 | 1107 | 270 |
| Productivity [kg/mol of metallocene] | 3900 | 4100 | 1800 |
| Melting point [°C.] | 141.2 | 143.9 | 141.8 |
| $M_w$ | 160000 | 166000 | 152000 |
| $M_w:M_n$ | 3.4 | 3.2 | 3.9 |

The melting points were determined by means of DSC measurements (10° C./min heating rate). The weight average values $M_w$ and number average values $M_n$ were determined by gel permeation chromatography.

We claim:

1. A supported catalyst system obtained by a) reacting a finely divided carrier with an α-trisalkoxy-silyl-ω-haloalkyl compound, b) adding a metallocene complex of the formula I

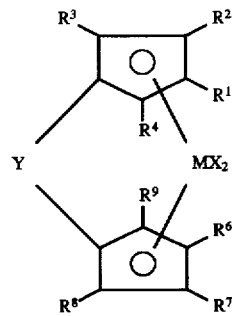

where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or —$OR^5$, $R^5$ is $C_1$–$C_{10}$-alkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $R^1$ to $R^3$ and $R^6$ to $R^8$ are each hydrogen, $C_1$–$C_{10}$-alkyl, 5-membered to 7-membered cycloalkyl which in turn may carry $C_1$–$C_{10}$-alkyl radicals as substituents, $C_6$–$C_{15}$-aryl or arylalkyl, where two neighboring radicals together may furthermore be a cyclic group of 4 to 15 carbon atoms, or $Si(R^{10})_3$, $R^{10}$ is $C_1$–$C_{10}$-alkyl, $C_6$–$C_{15}$-aryl or $C_3$–$C_{10}$-cycloalkyl, $R^4$ is

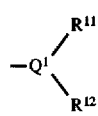

$Q^1$ is nitrogen, phosphorus, arsenic, antimony or bismuth, $R^{11}$ and $R^{12}$ are each $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, or the two radicals together may be a cyclic group of 2 to 15 carbon atoms which in turn may contain 1 to 8 heteroatoms of main groups III to VI of the Periodic Table of Elements $R^9$ is hydrogen, $C_1$–$C_{10}$-alkyl, 5-membered to 7-membered cycloalkyl which in turn may carry $C_1$–$C_{10}$-alkyl radicals as substituents, $C_6$–$C_{15}$-aryl or arylalkyl, where two neighboring radicals together may furthermore be a cyclic group of 4 to 15 carbon atoms, or $Si(R^{13})_3$ or

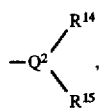

$R^{13}$ is $C_1$–$C_{10}$-alkyl, $C_6$–$C_{15}$-aryl or $C_3$–$C_{10}$-cycloalkyl, Q2 is nitrogen, phosphorus, arsenic, antimony or bismuth, $R^{14}$ and $R^{15}$ are each $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, or the two radicals together may be a cyclic group of 2 to 15 carbon atoms which in turn may contain 1 to 8 heteroatoms of main groups III to VI of the Periodic Table of Elements, Y is

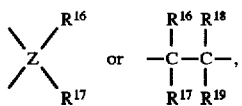

Z is silicon, germanium, tin or carbon and, $R^{16}$, $R^{17}$, $R^{18}$ and $R^{19}$ are each hydrogen, $C_1$–$C_{10}$-alkyl, $C_3$–$C_{10}$-cycloalkyl or $C_6$–$C_{15}$-aryl, where two neighboring radicals together may furthermore be a cyclic group of 4 to 15 carbon atoms, c) reacting with a quaternizing agent of the formula V

 V where is $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $X^2$ is fluorine, chlorine, bromine, iodine, $SO_3{}^{2-}$, $SO_4{}^{2-}$ or $NO_3{}^-$ and a is 1 or 2, and d) optionally, adding an open-chain or cyclic alumoxane compound of the formula VI or VII

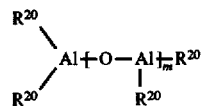 VI

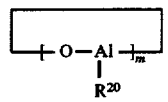 VII where $R^{20}$ is $C_1$–$C_4$-alkyl and m is an integer from 5 to 30, in the stated sequence.

2. A supported catalyst system as defined in claim 1, wherein the finely divided carrier is an oxide of an element of the main group III or IV of the Periodic Table or mixtures thereof.

3. Process for the preparation of a supported catalyst system which comprises:

a) reacting a finely divided carrier with an α-trisalkoxy-sily-ω-haloalkyl compound, b) adding a metallocene complex of the formula I

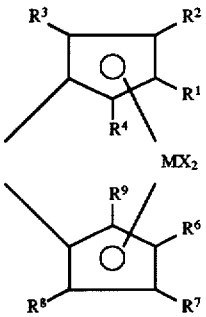 I where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl or —$OR^5$, $R^5$ is $C_1$–$C_{10}$-alkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $R^1$ to $R^3$ and $R^6$ to $R^8$ are each hydrogen, $C_1$–$C_{10}$-alkyl, 5-membered to 7-membered cycloalkyl which in turn may carry $C_1$–$C_{10}$-alkyl radicals as substituents, $C_6$–$C_{15}$-aryl or arylalkyl, where two neighboring radicals together may furthermore be a cyclic group of 4 to 15 carbon atoms, or $Si(R^{10})_3$, $R^{10}$ is $C_1$–$C_{10}$-alkyl, $C_6$–$C_{15}$-aryl or $C_3$–$C_{10}$-cycloalkyl, $R^4$ is

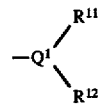

$Q^1$ is nitrogen, phosphorus, arsenic, antimony or bismuth, $R^{11}$ and $R^{12}$ are each $C_1$–$C_{10}$-alkyl, $C_3$–$C_{15}$-cycloalkyl, $C_6$–$C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, or the two radicals together may be a cyclic group of 2 to 15 carbon atoms which in turn may contain 1 to 8 heteroatoms of main groups III to VI of the Periodic Table of Elements $R^9$ is hydrogen, $C_1-C_{10}$-alkyl, 5-membered to 7-membered cycloalkyl which in turn may carry $C_1-C_{10}$-alkyl radicals as substituents, $C_6-C_{15}$-aryl or arylalkyl, where two neighboring radicals together may furthermore be a cyclic group of 4 to 15 carbon atoms, or $Si(R^{13})_3$ or

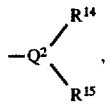

$R^{13}$ is $C_1-C_{10}$-alkyl, $C_6-C_{15}$-aryl or $C_3-C_{10}$-cycloalkyl,

Q2 is nitrogen, phosphorus, arsenic, antimony or bismuth, $R^{14}$ and $R^{15}$ are each $C_1-C_{10}$-alkyl, $C_3-C_{15}$-cycloalkyl, $C_6-C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, or the two radicals together may be a cyclic group of 2 to 15 carbon atoms which in turn may contain 1 to 8 heteroatoms of main groups III to VI of the Periodic Table of Elements, Y is

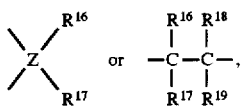

Z is silicon, germanium, tin or carbon and, $R^{16}$, $R^{17}$, $R^{18}$ and $R^{19}$ are each hydrogen, $C_1-C_{10}$-alkyl, $C_3-C_{10}$-cycloalkyl or $C_6-C_{15}$-aryl, where two neighboring radicals together may furthermore be a cyclic group of 4 to 15 carbon atoms, c) reacting with a quaternizing agent of the formula V $$A_aX^2 \qquad \qquad V$$

where

A is $C_1-C_{10}$-alkyl, $C_3-C_{15}$-cycloalkyl, $C_6-C_{15}$-aryl, alkylaryl, arylalkyl, fluoroalkyl or fluoroaryl, where in each case the alkyl radical is of 1 to 10 carbon atoms and the aryl radical is of 6 to 20 carbon atoms, $X^2$ is fluorine, chlorine, bromine, iodine, $SO_3^{2-}$, $SO_4^{2-}$ or $NO_3^-$ and a is 1 or 2, and d) optionally adding an open-chain or cyclic alumoxane compound of the formula VI or VII

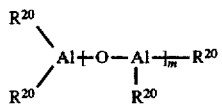

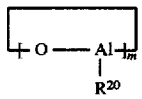

where $R^{20}$ is $C_1-C_4$-alkyl and is an integer from 5 to 30, in the stated sequence.

4. A process for the preparation of polymers of $C_2-C_{10}$-alk-1-enes which comprises polymerizing the $C_2-C_{10}$-alk-1-enes at from 0.5 to 3,000 bar and from −50 to 300° C. in the presence of the catalyst system defined in claim 1.

* * * * *

UNITED STATES PATENT AND TRADEMARK OFFICE
CERTIFICATE OF CORRECTION

PATENT NO.: 5,627,246

DATED: May 6, 1997

INVENTOR(S): LANGHAUSER et al.

It is certified that error appears in the above-identified patent and that said Letters Patent is hereby corrected as shown below:

On the cover page, in the Abstract, line 2, "a-trisalkoxy" should be
-- $\alpha$-trisalkoxy- --.

Column 13, claim 1, line 58, before "is $C_1$-$C_{10}$-alkyl" insert --A--.

Column 16, claim 3, line 30:

"$R^{20}$ is $C_1$-$C_4$-alkyl and is an integer from 5 to 30,"

should be
--$R^{20}$ is $C_1$-$C_4$-alkyl and
m is an integer from 5 to 30,--

Signed and Sealed this

Nineteenth Day of August, 1997

*Attest:*

BRUCE LEHMAN

*Attesting Officer*  Commissioner of Patents and Trademarks